United States Patent [19]

Vavra

[11] Patent Number: 4,913,192
[45] Date of Patent: Apr. 3, 1990

[54] GAS FLOW CONTROL APPARATUS

[75] Inventor: Randall J. Vavra, Orange, Calif.

[73] Assignee: Unit Instruments, Inc., Orange, Calif.

[21] Appl. No.: 332,572

[22] Filed: Apr. 3, 1989

[51] Int. Cl.[4] .............................................. B01F 5/04
[52] U.S. Cl. .................................. 137/889; 137/893; 137/895
[58] Field of Search ............... 137/888, 889, 892, 893, 137/895

[56] References Cited

U.S. PATENT DOCUMENTS

| | | |
|---|---|---|
| 1,878,478 | 9/1932 | Ensign et al. . |
| 2,494,778 | 1/1950 | Plass . |
| 2,785,012 | 3/1957 | Frewin . |
| 3,297,411 | 1/1967 | Dear . |
| 3,379,375 | 4/1968 | Walkling et al. . |
| 3,689,237 | 9/1972 | Stark et al. ..................... 137/893 X |
| 4,210,166 | 7/1980 | Munie . |
| 4,270,561 | 6/1981 | Bjorklund . |
| 4,315,600 | 2/1982 | Rhoades et al. . |
| 4,381,668 | 5/1983 | Sato et al. . |
| 4,615,352 | 10/1986 | Gibot ............................. 137/892 X |
| 4,645,009 | 2/1987 | Hawelka et al. . |
| 4,697,610 | 10/1987 | Bricker et al. . |

Primary Examiner—Robert G. Nilson
Attorney, Agent, or Firm—Fulwider, Patton, Lee & Utecht

[57] ABSTRACT

Gas flow control apparatus for controlling the flow of a process gas through a conduit system to a process site, for halting the flow of gas when the process is completed, and for then developing a partial vacuum in the conduit system sufficiently high to reduce the concentration of process gas and maintain it in a gaseous state. The partial vacuum is developed by carrier gas flowing through a venturi in communication with the conduit system supplying the process gas. The carrier gas also expels any remnants of the process gas from all points between the venturi and the process site. Further, the system can be used for vaporizing gases from liquids for use in an atmospheric process at the process site, the carrier gas flowing through the venturi and vaporizing a liquid in a chamber upstream of the venturi. The vaporized gases can then be regulated by a mass flow controller.

12 Claims, 4 Drawing Sheets

GAS FLOW CONTROL APPARATUS

BACKGROUND OF THE INVENTION

The present invention relates generally to apparatus for controlling the flow of a gas.

Industrial processes such as those used in the fabrication of semiconductor wafers in furnaces require a continuous flow of a process gas mixture to the furnace process site. A typical semiconductor fabrication process requires initial use of a particular mixture of gases, both reactive and inert, followed by a sequence of different gas mixtures as the process proceeds The rate of flow of the gases, their initiation and their shut off are under the control of one or more mass flow controllers.

The gas mixture proceeds from a mixing station or manifold through a conduit system which includes conventional tubing, hoses, control valves, the mass flow controllers and like components.

On completion of a processing step, closure of the associated control valve will halt the flow of process gas to the process site. However, remnants of the gas will remain in the system. Since the next process step may require use of a different mixture of gases, remnants of the first process gas mixture must be purged or expelled from the conduit system to avoid contaminating the new process gas. In addition, it is desirable to expel process gas remnants promptly after the end of all processing to minimize the harmful effects of any corrosive or reactive component gases remaining in the conduit system. Preferably, such purging should be done under automatic control. Although various ways of expelling remnants of process gases have been proposed, none has been entirely satisfactory.

Some components of process gas mixtures are obtained by vaporizing a liquid. Various means for vaporizing such a liquid and controlling flow of the resulting vapor have been proposed, but each suffers certain drawbacks, particularly complexity and difficulty of controlling the rate at which the vapor enters the associated control valve, especially if the process is being carried out at a pressure close to atmospheric.

It will be apparent from the foregoing that there is a need for gas flow control apparatus which provides a simple, automatically controllable means to purge process gas from as much of the conduit means as possible, and to minimize the effects of any such gas remaining in the conduit system after process gas shut off, and which also provides a simple means for vaporizing a liquid and controlling the flow rate of the vapor into the process gas mixture.

SUMMARY OF THE INVENTION

The present invention provides gas flow control apparatus operative to establish a partial vacuum in the conduit means through which a process gas flows toward the process site. The vacuum source is actuable on process gas shutoff to purge process gas from portions of the conduit means, and to establish a partial vacuum in the remainder of the conduit means to reduce the concentration of the process gas and maintain it in a gaseous state. The apparatus can also be operated during the process to vaporize a liquid in a chamber upstream of the conduit means to provide a component of the process gas.

More particularly, the apparatus according to the present invention includes a vacuum eductor means having a process gas inlet, a process gas outlet, a venturi nozzle, a venturi tube in communication with the process gas outlet and spaced from the venturi nozzle to define a venturi space in communication with the gas process inlet, a carrier gas inlet in communication with the nozzle, and conduit means for carrying a process gas to the process gas inlet. Admitting carrier gas to the carrier gas inlet creates the partial vacuum in the conduit means and expels or purges process gas from the system downstream from the venturi space.

The vapor phase of the liquid in the chamber is routed from the chamber in a fluid flow path which includes a mass flow controller so that the rate of vapor flow to the process gas inlet can be conveniently and easily controlled.

As will be apparent, the carrier gas can also be employed to create a partial vacuum while the process of fabricating semiconductor wafers, for example, is underway. This will aid in causing the process gas to flow to the process site. Normally, however, the process gas is under sufficient pressure that this is not necessary, and the carrier gas is not admitted until the process step has ended and the flow of associated process gas has been cut off.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

Figure 1:
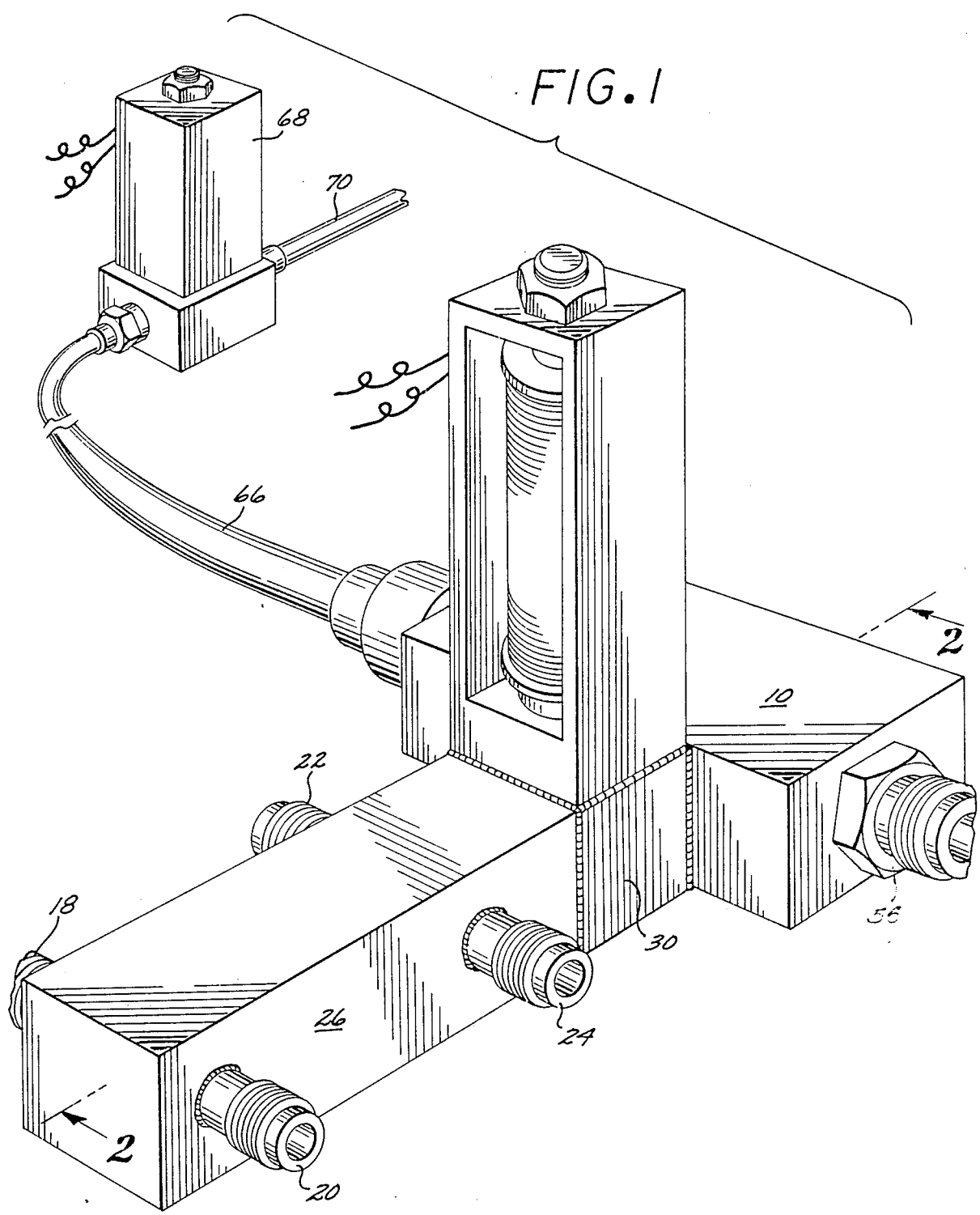
FIG. 1 is a perspective view of a preferred embodiment of gas flow control apparatus according to the present invention.

As shown in the drawings for purposes of illustration, the invention is embodied in gas flow control apparatus of the kind used to mix, measure, monitor and control the mass flow of a process gas to a process site such as a furnace containing semiconductor wafers.

Such apparatus typically includes a manifold 26 for accepting and mixing the various components of the process gas, and also some form of conduit system 16 for supplying the process gas, including conduits and passageways defined by conventional tubing, valves, flow controllers and the like.

The usual process for fabricating semiconductors includes a number of separate process steps or stages which each use a different mixture of process gas components. It is important on conclusion of one process step that the process gas for that step not be present in a concentration sufficient to contaminate the process gas for the next step, particularly where the process gas includes a reactive component. The present apparatus is effective to prevent such contamination by developing a partial vacuum in the conduit system. This capability is also useful in vaporizing a liquid for use as a component of the process gas. This is very convenient when the process site is at or near atmospheric pressure since it is relatively easy to control the mass flow of the vacuum induced vapor.

The development of the partial vacuum is accomplished by a venturi or vacuum eductor assembly 10 which defines a venturi space 13 through which the process gas flows. On process gas shut off a carrier gas is introduced into the eductor assembly to create the partial vacuum in the conduit system 16 upstream of the venturi space. This reduces the gas concentration sufficiently to maintain the remnants of the process gas in a gaseous state. Also, as indicated above, the partial vacuum can be used to vaporize a liquid for use as a component of the process gas during normal flow of the process gas. On process gas shut off, the continuing flow of carrier gas also purges any remaining process gas present downstream of the venturi space 13.

Figure 2:
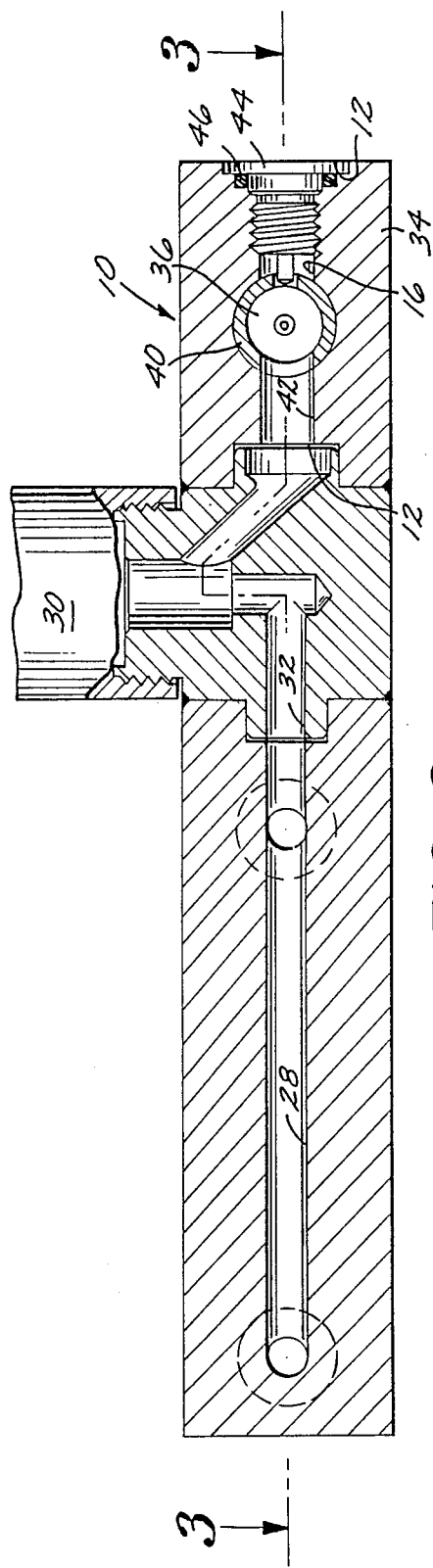
FIG. 2 is a sectional view taken along the line 2—2 of FIG. 1.
Figure 4:
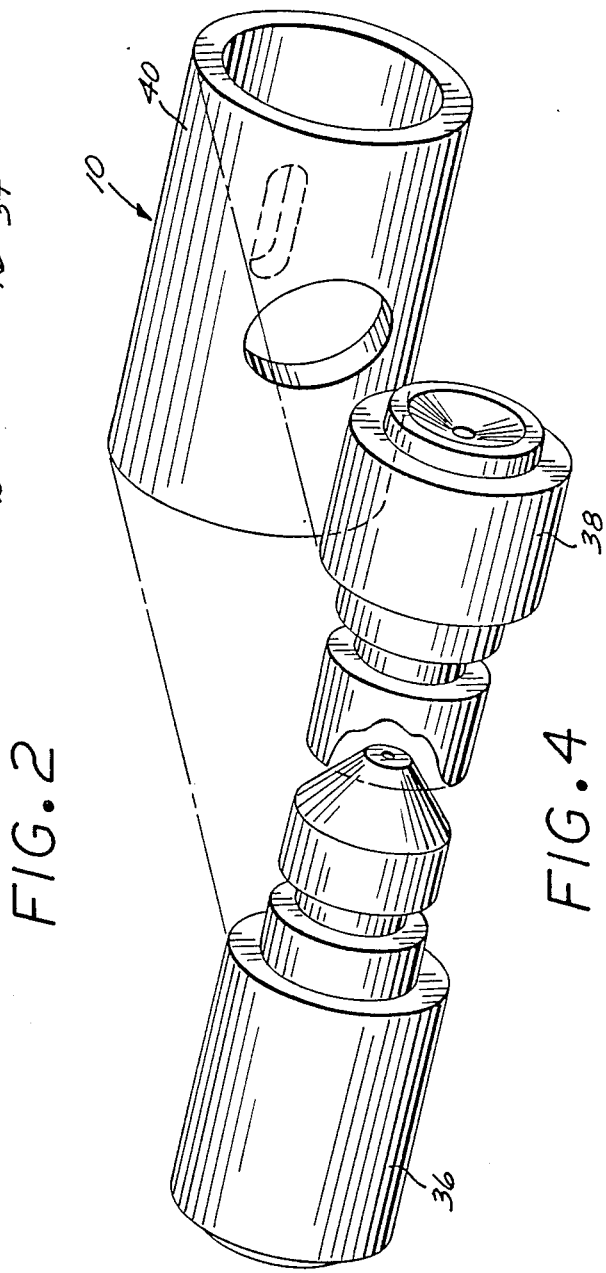
FIG. 4 is an exploded view of the vacuum eductor assembly shown in FIG. 1.
Figure 3:
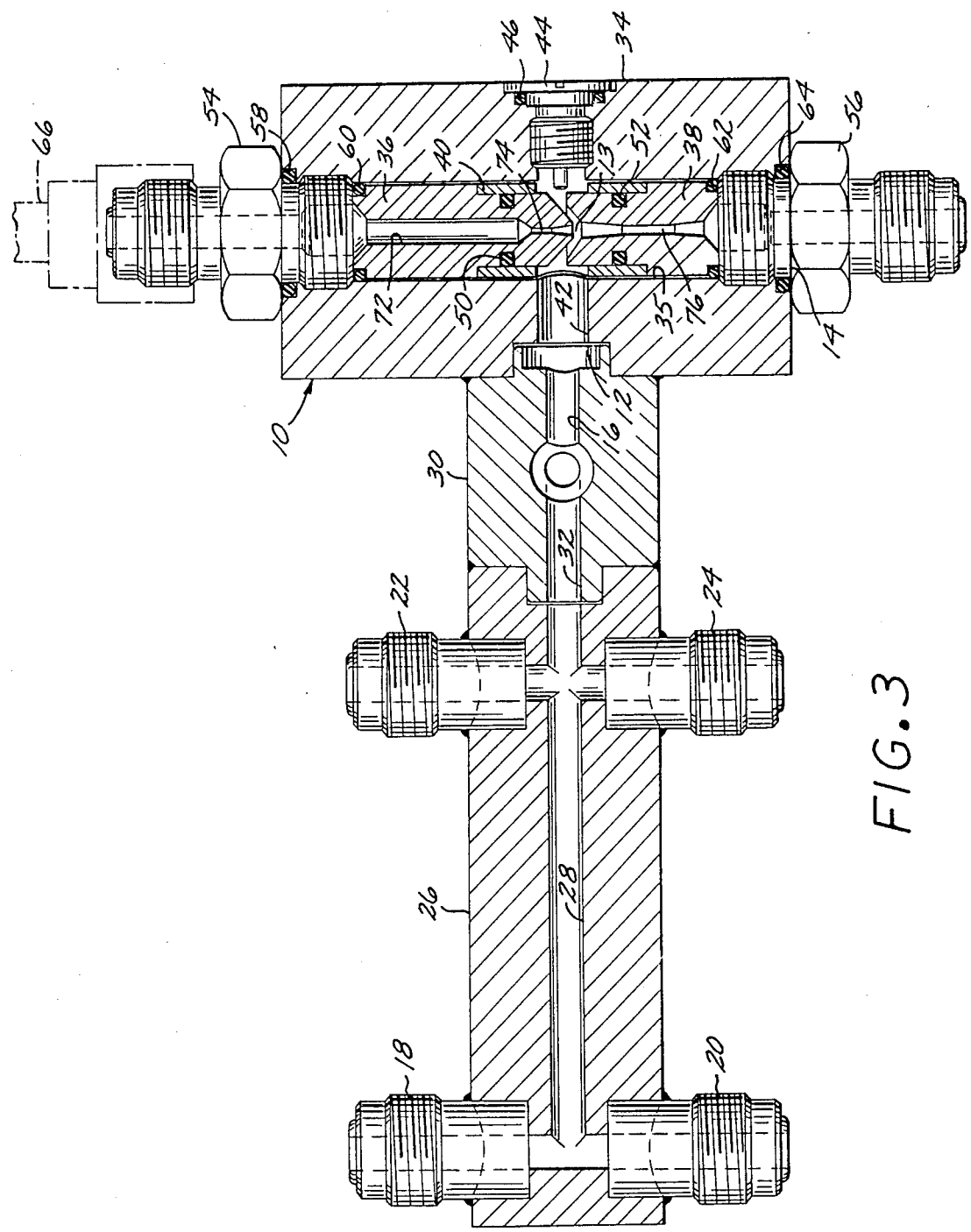
FIG. 3 is a sectional view taken along the line 3—3 of FIG. 2.

As shown in FIGS. 1 through 4, the eductor assembly 10 includes a process gas inlet 12, as best seen in FIGS. 2 and 3, the venturi space 13, and a process gas outlet 14.

The various process gas components pass from supply tanks or the like (not shown) through suitable conduits (not shown) which are coupled to inlet ports 18, 20, 22 and 24 that form an integral part of the mixing means or manifold 26. Passageways in the manifold 26 extend from the inlet ports to an elongated central conduit 28.

The manifold 26 is welded or otherwise attached to a control valve 30 so that a central conduit 32 of the valve 30 is in gas tight fluid communication with the manifold conduit 28. In similar fashion, the control valve 30 is attached to the eductor assembly 10 in gas tight relation so that the mixture of gases from the conduit 32 flows into the process gas inlet 12.

Any control valve 30 can be employed that is operable to turn on and shut off the gas flow, but a solenoid actuated valve is preferred because it can be remotely operated by an automatic control system programmed to start and stop the flow of process gas. This enables different combinations of process gas components to pass from the manifold 26 to the process site at predetermined intervals.

When the valve 30 is the shut off point the conduit system 16 to be purged of harmful concentrations of process gas comprises the gas passages or conduits located downstream from the valve 30 and extending to the venturi space 13. Where valve 30 is left open, and the gas shut off points are valves (not shown) associated with gas supply tanks or the like, the conduit system 16 in which a partial vacuum is developed includes all of the conduits and passageways up to such shut off valves, which would include any delicate mass flow controllers located downstream of such valves.

The eductor assembly 10 comprises a housing 34 having a central, longitudinally oriented bore 35 which slidably receives a cylindrical venturi nozzle 36 and a cylindrical venturi tube 38. The tube and the nozzle are aligned and their adjacent extremities include reduced diameter portions upon which the ends of a cylindrical nozzle sleeve or coupling 40 are seated.

The housing 34 also includes a transverse conduit 42 intersecting the bore 35 and having an upstream end defining the process gas inlet 12. The opposite end of the conduit 42 terminates in an auxiliary port normally closed by a threaded plug 44. The plug bears against a suitable O-ring 46 to provide a gas tight seal with the housing. The auxiliary port is useful, for example, in extracting process gas samples for analysis while the process is underway.

The nozzle coupling 40 has transversely aligned openings that communicate with the conduit 42 to admit process gas, and to communicate with the plug 44, respectively.

The coupling 40 spaces the nozzle and tube ends apart sufficiently to define the venturi space 13.

The fit between the coupling 40 and the nozzle 36 and tube 38 is made gas tight by a pair of O-rings 50 and 52 located in annular grooves provided in the nozzle and tube, respectively.

The outer extremities of the venturi nozzle and tube are engaged, respectively, by the inner ends of coupling nuts 54 and 56 which are threadably received within threaded counterbores provided in the opposite extremities of the bore 35. O-rings 58, 60, 62 and 64 located between the nozzle, tube, the adjacent nuts 54 and 56, and the associated portions of the housing 34 provide a gas tight fit, as will be apparent.

The nut 54 is coupled to a flexible conduit 66, as best seen in FIG. 1, which is attached to a suitable control valve 68. The valve 68 is connected by a conduit 70 to a source of inert carrier gas such as nitrogen. The other nut 56 is coupled to a conduit (not shown) which carries process gas from the process gas outlet 14 to the furnace or other process site.

The gas passage through the venturi nozzle 36 includes a substantially constant diameter upper passage 72 which narrows to a relatively small diameter lower passage 74 in communication with a passage increasing slightly in diameter and opening into the venturi space 13.

The lower tip of the nozzle 36 is conical and extends into a complementally configured conical depression formed in the upper end of the venturi tube 38. This conical depression is in communication with a longitudinal passageway 76 extending through the tube 38 and terminating in an end which defines the process gas outlet 14. The passageway 76 is of relatively small diameter, increasing gradually in diameter toward the cavity defining the venturi space 13, and also increasing in diameter in the opposite direction toward the process gas outlet 14.

In operation, the process gas components are admitted into the manifold 26 in the proper proportion by mass flow controllers or the like (not shown) which are associated with the gas supply for each such component. The mixture then passes through the manifold conduit 28 into the control valve conduit 32.

Energization of control valve 30 by the associated automatic control system allows process gas to pass from the control valve to the process gas inlet 12. From this point the process gas passes through the transverse eductor assembly conduit 42, through the opening in the coupling 40, and into the venturi space 13. The process gas next flows through the venturi tube passageway 76, out of the process gas outlet 14, and on to the furnace or other process site.

Assuming the overall process requires a modified gas mixture for the next process step, the automatic control system next closes the control valve 30 and halts further flow of the first gas mixture. The automatic control system then opens the control valve 68 to allow carrier gas to flow through the conduit 66 and into the eductor assembly 10.

The carrier gas is under pressure and its flow is therefore sufficiently rapid that a relatively low pressure is developed in the venturi space 13. This develops a partial vacuum in the conduit means 16 which, in this instance, constitutes the conduit 42 and the control valve conduit located downstream of the closure element of the valve. The partial vacuum is sufficient to maintain the process gas in vapor form, and to reduce the concentrations of reactive gas components to a level insufficient to attack the walls and other components which define the conduit means.

The carrier gas flowing downstream from the venturi space 13 purges all process gas in the downstream conduits and passageways, extending all the way to the process site itself, so that the site is rendered neutral and ready for the next gas mixture.

After a suitable interval, the central control system closes the carrier gas valve 68 and admits the next combination of process gas components to the manifold 26. The control valve 30 is then opened and the mixed gases pass into the eductor assembly 10 as before.

After processing of the semiconductor wafers is finished, control valve 30 is left open and the valves (not shown) which control the flow of gas components to ports 18, 20, 22 and 24 are closed. The carrier gas valve 68 is then opened and carrier gas flowing past the venturi space 13 develops a partial vacuum in the conduit means, which now includes all of the conduits and passageways up to the gas supply valves located upstream of the manifold 26. This reduces the concentration of process gas back up to the supply valves at a level that components located downstream of such valves are protected from corrosive attack.

In addition to the ability of the present apparatus to prevent harmful levels of concentration of process gas, the apparatus is also useful to develop and control the flow of controlled quantities of a process gas component normally liquid at atmospheric pressures.

Figure 5:
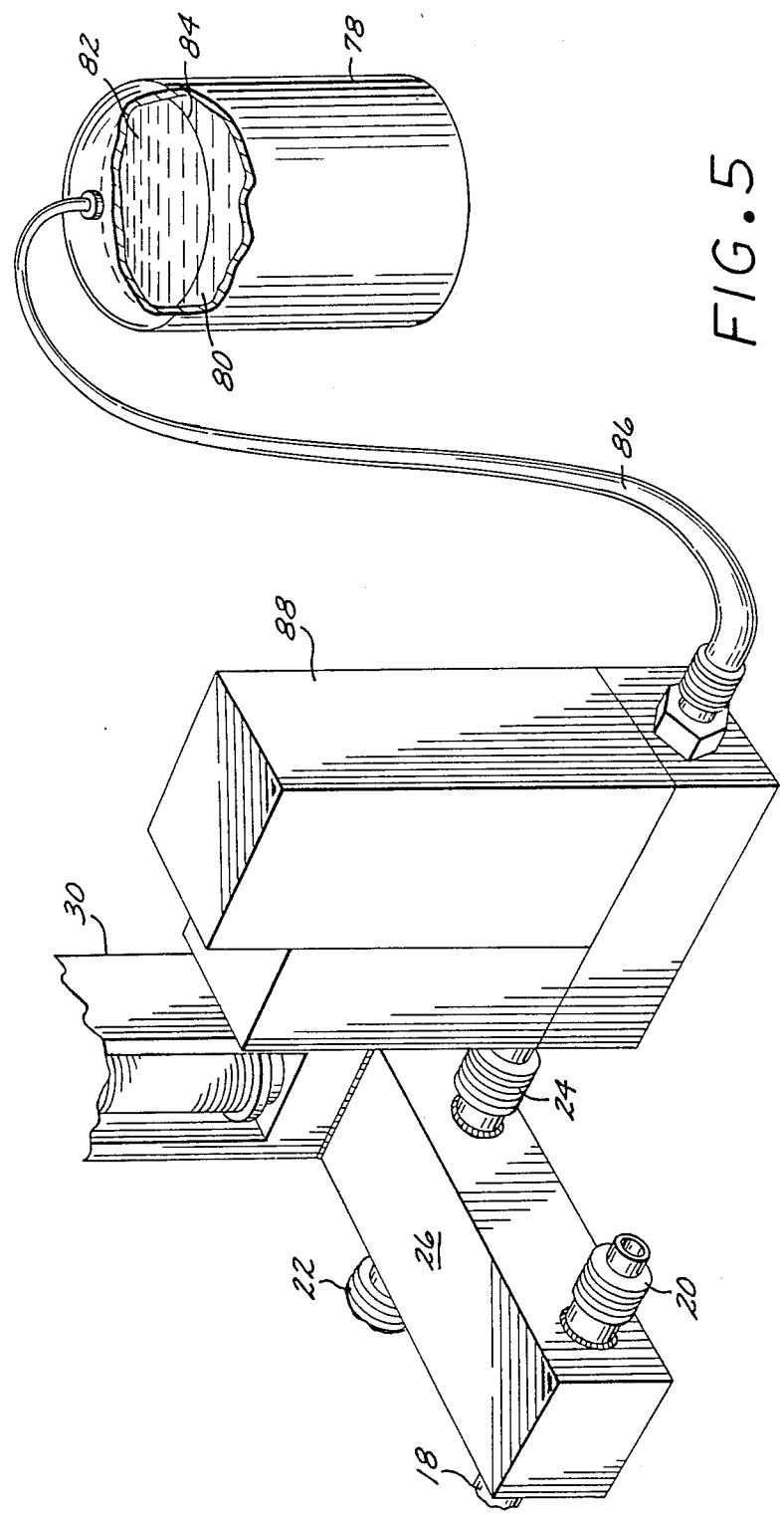
FIG. 5 is a perspective view of an embodiment similar to that shown in FIG. 1 but including a vessel for holding a liquid to be vaporized and a mass flow controller for controlling the flow of the resulting vapor.

With reference to FIG. 5, a vessel 78 defines a chamber 80 which is filled with the process gas liquid 82. A space defined between the liquid and the upper extremity 84 of the vessel is in communication with a flexible conduit 86 coupled to a suitable mass flow controller 88. The controller outlet conduit is coupled to inlet port 24 of manifold 26.

When carrier gas is admitted through conduit 66 to the eductor assembly 10, the resulting partial vacuum vaporizes some of the liquid in the chamber 80, and draws that vapor through the conduit 86 and the controller 88 to the manifold 26. From there the vapor flows through the eductor assembly 10 to the process site.

In its vapor form the amount of vapor flow into the manifold 26 is easily controlled by the controller 88. Thus, the present apparatus readily lends itself to use in processes in which a liquid must be vaporized for employment as a component of the process gas.

Wherever elements of the present apparatus may be exposed to reactant components of the process gas, such elements are preferably fabricated of a nonmetallic, corrosion resistant material such as KEL-F, which manufactured by Minnesota Mining and Manufacturing Co.

From the foregoing it will be appreciated that gas flow control apparatus according to the present invention provides an effective means for reducing the corrosive effect of reactant components of process gas so that process gas used in one stage of the overall process does not remain after gas shut off in sufficient concentrations to contaminate the process gas used in the next step. Further, on shut down of the entire system, the present apparatus provides an effective way to establish a partial vacuum, and consequently reduce process gas concentration, upstream of the process site all the way to the component gas supply valves. The carrier gas utilized to establish the partial vacuum can also purge out of the system all process gas downstream from the venturi which establishes the vacuum. In addition, the apparatus optionally employs the partial vacuum for vaporizing a liquid to provide a component of the process gas whereby the amount of such liquid utilized in an atmospheric process, for example, is easily controlled by regulating the flow of its vapor.

Various modifications and changes may be made with regard to the foregoing detailed description without departing from the spirit of the invention.

We claim:

1. Gas flow control apparatus comprising:
vacuum eductor means including a process gas inlet, a process gas outlet and a gas flow passageway therebetween;
conduit means for carrying a process gas to the process gas inlet, the conduit means including a manifold for accepting and mixing a plurality of component gases to provide the process gas; and the vacuum eductor means being operative to establish a partial vacuum in the gas flow passageway on shut off of the process gas to establish a partial vacuum in the conduit means sufficiently high to reduce the concentration of the process gas in the conduit means and maintain it in a gaseous state.

2. Apparatus according to claim 1 wherein the conduit means includes a process gas control valve for shutting off the process gas.

3. Apparatus according to claim 1 and further comprising a vessel defining a chamber for holding a component of the process gas in liquid form, and means defining a vapor flow path between the chamber and the conduit means, the vacuum eductor means being operative to vaporize liquid in the chamber and draw the vapor through the flow path, through the conduit means to the process gas inlet, and through the gas flow passageway to the process gas outlet.

4. Apparatus according to claim 3 and further comprising a mass flow controller in the vapor flow path operative to control the rate of flow of the vapor.

5. Gas flow control apparatus comprising:
vacuum eductor means including a process gas inlet, a process gas outlet, a venturi nozzle, a venturi tube in communication with the process gas outlet and spaced from the venturi nozzle to define a venturi space in communication with the gas process inlet, and a carrier gas inlet in communication with the nozzle;
conduit means for carrying a process gas to the process gas inlet, the conduit means including a manifold for accepting and mixing a plurality of component gases to provide the process gas; and
means for admitting a carrier gas to the carrier gas inlet whereby the carrier gas flows across and creates a partial vacuum in the venturi space, thereby tending to draw process gas from the conduit means, and operative on shut off of the process gas to establish a partial vacuum in the conduit means sufficiently high to reduce the concentration of the process gas in the conduit means and maintain it in a gaseous state during flow of the carrier gas out of the process gas outlet.

6. Apparatus according to claim 5 wherein the conduit means includes a process gas control valve for shutting off the process gas.

7. Apparatus according to claim 5 and further comprising a vessel defining a chamber for holding a component of the process gas in liquid form, and means defining a vapor flow path between the chamber and the conduit means, the vacuum means being operative to vaporize liquid in the chamber and draw the vapor through the flow path, through the conduit means to the process gas inlet, and through the vacuum eductor means to the process gas outlet. through the conduit means to the process gas inlet, and through the vacuum eductor means to the process gas outlet.

8. Apparatus according to claim 7 wherein the means for admitting the carrier gas includes a carrier gas control valve for adjusting the flow of carrier gas across the venturi space.

9. Apparatus according to claim 7 and further comprising a mass flow controller in the vapor flow path operative to control the rate of flow of the vapor.

10. Apparatus according to claim 5 and further comprising a coupling sleeve coupling the venturi nozzle and the venturi tube, the sleeve having an opening in fluid communication with the conduit means for admitting process gas to the venturi space.

11. Gas flow control apparatus comprising:
vacuum eductor means including a process gas inlet, a process gas outlet and a gas flow passageway therebetween;
conduit means for carrying a process gas to the process gas inlet, the vacuum eductor means being operative to establish a partial vacuum in the gas flow passageway on shut off of the process gas to establish a partial vacuum in the conduit means sufficiently high to reduce the concentration of the process gas in the conduit means and maintain it in a gaseous state;
a vessel defining a chamber for holding a component of the process gas in liquid form;
means defining a vapor flow path between the chamber and the conduit means, the vacuum eductor means being operative to vaporize liquid in the chamber and draw the vapor through the flow path, through the conduit means to the process gas inlet, and through the gas flow passageway to the process gas outlet; and
a mass flow controller in the vapor flow path operative to control the rate of flow of the vapor.

12. Gas flow control apparatus comprising:
vacuum eductor means including a process gas inlet, a process gas outlet, a venturi nozzle, a venturi tube in communication with the process gas outlet and spaced from the venturi nozzle to define a venturi space in communication with the gas process inlet, and a carrier gas inlet in communication with the nozzle;
conduit means for carrying a process gas to the process gas inlet;
means for admitting a carrier gas to the carrier gas inlet whereby the carrier gas flows across and creates a partial vacuum in the venturi space, thereby tending to draw process gas from the conduit means, and operative on shut off of the process gas to establish a partial vacuum in the conduit means sufficiently high to reduce the concentration of the process gas in the conduit means and maintain it in a gaseous state during flow of the carrier gas out of the process gas outlet;
a vessel defining a chamber for holding a component of the process gas in liquid form;
means defining a vapor flow path between the chamber and the conduit means, the vacuum means being operative to vaporize liquid in the chamber and draw the vapor through the flow path, through the conduit means to the process gas inlet, and through the vacuum eductor means to the process gas outlet; and
a mass flow controller in the vapor flow path operative to control the rate of flow of the vapor.

* * * * *

UNITED STATES PATENT AND TRADEMARK OFFICE
CERTIFICATE OF CORRECTION

PATENT NO. : 4,913,192

DATED : April 3, 1990

INVENTOR(S) : Randall J. Vavra

It is certified that error appears in the above-identified patent and that said Letters Patent is hereby corrected as shown below:

Column 6, line 23, after "therebetween;" insert --and--; and

Column 7, line 15, after "outlet." delete [through the conduit means to the process gas inlet, and through the vacuum eductor means to the process gas outlet.]

Signed and Sealed this

Fourth Day of February, 1992

Attest:

HARRY F. MANBECK, JR.

Attesting Officer

Commissioner of Patents and Trademarks